United States Patent
Alaqel (10) Patent No.: US 11,550,953 B2
(45) Date of Patent: Jan. 10, 2023

(54) PRESERVING CLOUD ANONYMITY

(71) Applicant: Saudi Arabian Oil Company, Dhahran (SA)

(72) Inventor: Maryam Adel Alaqel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 192 days.

(21) Appl. No.: 17/022,850

(22) Filed: Sep. 16, 2020

(65) Prior Publication Data

US 2022/0083689 A1 Mar. 17, 2022

(51) Int. Cl.
*G06F 21/62* (2013.01)
*H04L 9/40* (2022.01)
*H04L 67/1097* (2022.01)

(52) U.S. Cl.
CPC ...... *G06F 21/6254* (2013.01); *H04L 63/0421* (2013.01); *H04L 67/1097* (2013.01)

(58) Field of Classification Search
CPC ............. G06F 21/6254; H04L 63/0421; H04L 67/1097
USPC .......................................................... 726/28
See application file for complete search history.

(56) References Cited

U.S. PATENT DOCUMENTS

| | | | |
|---|---|---|---|
| 997,339 A | 7/1911 | Steynis | |
| 8,468,244 B2 | 6/2013 | Redlich et al. | |
| 9,369,471 B2 * | 6/2016 | Zent | G06F 21/30 |
| 9,965,650 B1 * | 5/2018 | Erez | G16H 10/60 |
| 9,973,339 B1 * | 5/2018 | Lyadvinsky | H04L 63/06 |
| 10,241,842 B2 | 3/2019 | Smith et al. | |
| 10,536,466 B1 * | 1/2020 | Griffin | G06F 16/951 |
| 10,616,224 B2 | 4/2020 | Subramanian et al. | |
| 2002/0116337 A1 * | 8/2002 | Peled | G06Q 30/06 705/26.1 |

(Continued)

FOREIGN PATENT DOCUMENTS

| | | |
|---|---|---|
| CN | 105955989 | 9/2016 |
| CN | 109766215 A * | 5/2019 |

(Continued)

OTHER PUBLICATIONS

PCT International Search Report and Written Opinion in International Appln. No. PCT/US2021/050081, dated Dec. 20, 2021, 16 pages.

(Continued)

*Primary Examiner* — Tauqir Hussain
(74) *Attorney, Agent, or Firm* — Fish & Richardson P.C.

(57) ABSTRACT

Systems and methods include a method for anonymizing users in the cloud. A data storage anonymity level is determined for each user storing data in the cloud. A determination is made whether the data storage footprint size is outside of a data storage footprint size range relative to other users. The data storage anonymity level of the first user is increased by reallocating data storage of other users to change the data storage footprint size of the other users. A connection anonymity level is determined for each user in the group storing data in the cloud. A determination is made whether the data access rate of the second user is outside of a data access rate range relative to data access rates of other users. The connection anonymity level of the second user increased by adjusting data access rates of other users.

17 Claims, 3 Drawing Sheets

(56) References Cited

U.S. PATENT DOCUMENTS

| | | | | |
|---|---|---|---|---|
| 2004/0117500 | A1* | 6/2004 | Lindholm | G06F 21/10 709/231 |
| 2011/0307551 | A1* | 12/2011 | Danezis | H04W 4/21 380/46 |
| 2012/0231767 | A1* | 9/2012 | Kagawa | H04M 3/42008 455/411 |
| 2015/0067883 | A1* | 3/2015 | Shen | G06Q 50/01 726/27 |
| 2015/0082406 | A1* | 3/2015 | Park | H04L 63/105 726/9 |
| 2015/0101022 | A1* | 4/2015 | Zent | H04L 63/104 726/4 |
| 2015/0350160 | A1* | 12/2015 | Nathan | H04L 67/52 726/14 |
| 2016/0132697 | A1* | 5/2016 | Simske | G06F 21/6254 726/26 |
| 2016/0350557 | A1* | 12/2016 | Mikami | G06F 16/2282 |
| 2017/0005911 | A1* | 1/2017 | Kasargod | H04L 45/42 |
| 2017/0249480 | A1* | 8/2017 | Hu | G06F 16/21 |
| 2017/0272242 | A1* | 9/2017 | Morrell | H04L 9/3242 |
| 2019/0026490 | A1* | 1/2019 | Ahmed | G06F 21/6254 |
| 2021/0049710 | A1* | 2/2021 | Haywood | G06Q 30/08 |
| 2022/0012361 | A1* | 1/2022 | Eberlein | G06F 17/16 |

FOREIGN PATENT DOCUMENTS

| | | |
|---|---|---|
| WO | WO 2014039497 | 3/2014 |
| WO | WO 2016045071 | 3/2016 |

OTHER PUBLICATIONS

Maenhaut et al., "Resource Allocation in the Cloud: From Simulation to Experimental Validation," 2017 IEEE 10th International Conference on Cloud Computing, 2017, 4 pages.

Maluf et al., "Trust Erosion: Dealing with Unknown-Unknowns in Cloud Security," IEEE Cloud Computing, Jul.-Aug. 2018, 5(4):24-32.

Raghuwanshi et al., "MS2: Practical data privacy and security framework for data at rest in cloud," 2014 World Congress on Computer Applications and Information Systems, 2014, 8 pages.

Sidorov et al., "Transparent Data Encryption for Data-in-Use and Data-at-Rest in a Cloud-Based Database-as-a-Service Solution," 2015 IEEE World Congress on Services, 2015, 8 pages.

Youssef et al., "Intrusion detection in cloud computing based attacks patterns and risk assessment," 2016 Third International Conference on Systems of Collaboration, 2016, 4 pages.

Zimba et al., "On Man-in-the-Cloud (MITC) attacks: The analytical case of Linux," IEEE International Conference on Intelligence and Security Informatics, 2017, 3 pages.

* cited by examiner

PRESERVING CLOUD ANONYMITY

BACKGROUND

The present disclosure applies to storing information in the cloud.

The information technology field is undergoing a rapid transition from traditional local hosting computing operations to cloud solutions. Companies are moving entire datacenters to the cloud to harness all the benefits that the cloud can provide. Those benefits include ease-of-use of cloud technology and reducing or eliminating maintenance costs of local systems.

However, as is the case with local hosting, cloud services can be susceptible to security risks. For example, data breaches can occur that may result in business interruption and damage to a company's reputation. A shared cloud that stores data can include encrypted and non-encrypted data of multiple companies. For example, a cloud service may store encrypted data of Company A and Company B. In the case of a data breach, some attackers can trace back to the targeted company using data learned during data breach. For example, even without accessing the encrypted data directly, an attacker can identify a target company based on the target company's connection behavior. As a result, conventional cloud products are unable to provide control over an anonymity degree for users, allowing the identity of users to be recovered and abused during cybersecurity attacks.

During the rapid shift to utilize cloud technology and to harness the cloud's remarkable advantages, deploying cloud services can expose users to the risk of losing their privacy, especially when an inevitable breach occurs. As cyberattacks increase in numbers and sophistication, solutions are needed to prepare shared cloud environments that provide high-level privacy to the cloud's users. While shared cloud services may invest in providing numerous cloud products, less attention may be made regarding increases in cybersecurity attacks on cloud.

SUMMARY

The present disclosure describes techniques that can be used for hiding or anonymizing information in the cloud. For example, by omitting information that a cyberattack may otherwise uncover, data linkages between cloud information and the information's owner can be made invisible.

In some implementations, a computer-implemented method includes the following. A data storage anonymity level is determined for each user in a group of users storing data in the cloud. The data storage anonymity level of a first user is based on a data storage footprint size of data stored by the first user in the cloud and attributable to the first user. A determination is made whether the data storage footprint size is outside of a data storage footprint size range relative to data storage footprint sizes of data stored by other users in the group of users. The data storage anonymity level of the first user is increased by reallocating data storage of at least one other user in the group of users to change the data storage footprint size of the at least one other user. A connection anonymity level is determined for each user in the group of the users storing data in the cloud, where the connection anonymity level of a second user is based on a data access rate of the data stored by the second user in the cloud and attributable to the second user. A determination is made whether the data access rate of the second user is outside of a data access rate range relative to data access rates of the data stored by the other users. The connection anonymity level of the second user increased by adjusting data access rates of at least one other user in the group of users.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, the techniques of the present disclosure can provide a higher level of user privacy while preserving confidentiality and providing more control over the anonymity of the users and increasing the invisibility of data owners. Second, the techniques of the present disclosure can support the concept of the defense in depth (DiD). For example, defensive layers can be added to protect major identifying information of users by omitting some of the identifiable attributes of the cloud service regarding users, limiting statistical inference, limiting sensitive data exposure, limiting users' footprints when communicating over cloud services, and protecting users and cloud providers. Third, company valuable assets and data can be protected, ensuring the availability of users' information and guaranteeing business continuity.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for providing a Preserve Cloud Anonymity (PCA) system for cloud services. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The present disclosure provides techniques that can be used to solve technical problems that include data disclosure and compromising the privacy of cloud users. The techniques include solutions that implement a privacy agreement between a cloud master and an agent. The present disclosure focuses on enhancing privacy of cloud users by introducing an improved approach in the communication with cloud service providers. Additionally, the techniques can enhance and customize data allocation in the cloud to defend statistical inference attacks, such as by a Remote Access Trojan (RAT).

Conventional systems may be limited to regulating what data is or is not isolated from a third party. Techniques of the present disclosure can add an additional layer of protection by providing a solution for improving privacy of cloud users and optimizing data allocation in the cloud (so as to prevent the inference of user identities).

Conventional systems may consider a cloud master and a slave within a cloud's architecture, without applying the concept on the user's side. In this way, the cloud master and slave are considered as servers on cloud providers. However, techniques of the present disclosure do not focus on the cloud itself, but rather provide a part of services management on the clients' side in order to control the anonymity level of the user.

Techniques of the present disclosure can be used to improve privacy. Privacy can be defined, for example, as the right, by a user or company, to be free from secret surveillance and to determine whether, when, how, and to whom, one's personal or organizational information is to be revealed.

A query can be defined as inquiry which is agreed upon in both a cloud agent and a cloud master. The query can be sent, for example, after an authentication phase is completed. The time for sending a query from a cloud agent can depend on one or more specific triggering events, such as a new geographic location associated with the query, or a query set to be executed during a specific period of time. In addition, the query can be considered as an element of a triggering update from a master to an agent and vice versa.

Cloud users' network footprints can be decreased, for example, by increasing their level of anonymity. This can be done by randomizing identifying information within the cloud infrastructure through introducing an asymmetrical communication using a cloud master and agent method. Different implementations of randomization can be implemented with either a cloud agent within the enterprise network or with a cloud master within the cloud service provider.

In some implementations, a cloud agent application can send a query request to a cloud master to inquire the current anonymity level. The cloud master can reply with information or instructions regarding data allocation and data communication.

This level of anonymity of cloud users can be increased by randomizing identifying information within the cloud infrastructure through techniques that uses a cloud master and an agent. The techniques can take into consideration multiple identifiers that would be utilized to gauge and control anonymity level of the involved entities.

The storage space that is utilized by a company can potentially reveal the identity of that company. When a cyber-attack occurs on the cloud, an attacker can learn which company is utilizing large amounts of cloud storage as compared to the storage share of other companies. Storage space is a piece of information that, when combined with other identifiers, can compromise the privacy of the company.

The anonymity level of a user can be used during a cyber-attack as a lead to an entity's values. Therefore, a higher anonymity level cannot be achieved if the number of entities having the same anonymity level is equal to 1. This is the case in Table 1, where the higher anonymity of Company E is 0.2 and the higher anonymity of the other companies is 0.8. The higher the anonymity level of cloud data, the higher privacy it offered. Table 1 illustrates anonymity levels achieved with the use of PCA and the anonymity level calculation for a sample entry.

In this sample, consider that Company E is requesting a cloud service from the cloud master server. This example takes into consideration data storage attribute exclusively with specific storage size range $R_1$ given in Equation (1):

$$1.2 \text{ TB} \geq R_1 \geq 800 \text{ GB} \tag{1}$$

All users are in the same range of values and have an anonymity level of 0.8, except for Company E which achieves an anonymity level of 0.2. Company E achieves this score because the entity is out of the selected range given in Equation (1). In order to resolve the issue, the cloud master can create another suitable range $R_2$ presented in Equation (2):

$$800 \text{ GB} > R_2 \geq 200 \text{ GB} \tag{2}$$

The cloud master will look up the smallest data storage value within the previous range $R_1$ which is 800 GB. Then, the cloud master will divide the traffic until the value of anonymity level is satisfied, as seen in the results in Table 2. In this example, the cloud master creates two virtual users, Companies B1 and B2, to split the traffic equally, each Company B1 and B2 having 400 GB. $R_1$ and $R_2$ are just two example storage size ranges, and many more ranges can exist.

TABLE 1

Anonymities Achieved Without PCA

| Users | Attribute | Value | Anonymity Level |
|---|---|---|---|
| Company A | Data storage in cloud | 1 TB | 0.8 |
| Company B | | 800 GB | 0.8 |
| Company C | | 1.1 TB | 0.8 |
| Company D | | 900 GB | 0.8 |
| Company E | | 200 GB | 0.2 |
| Company A | Connection (traffic) | 40/hr. | 0.4 |
| Company B | | 2/hr. | 0.4 |
| Company C | | 15/hr. | 0.2 |
| Company D | | 1/hr. | 0.4 |
| Company E | | 30/hr. | 0.4 |

TABLE 2

Anonymities Achieved With PCA

| Users | Attribute | Value | Anonymity Level |
|---|---|---|---|
| Company A | Data storage in cloud | 1 TB | 0.5 |
| Company B-1 | | 400 GB | 0.5 |
| Company B-2 | | 400 GB | 0.5 |
| Company C | | 1.1 TB | 0.5 |

TABLE 2-continued

Anonymities Achieved With PCA

| Users | Attribute | Value | Anonymity Level |
|---|---|---|---|
| Company D | | 900 GB | 0.5 |
| Company E | | 200 GB | 0.5 |
| Company A | Connection (traffic) | 40/hr. | 0.6 |
| Company B | | 2/hr. | 0.4 |
| Company C | | 20/hr. | 0.6 |
| Company D | | 1/hr. | 0.4 |
| Company E | | 30/hr. | 0.6 |

Figure 1:
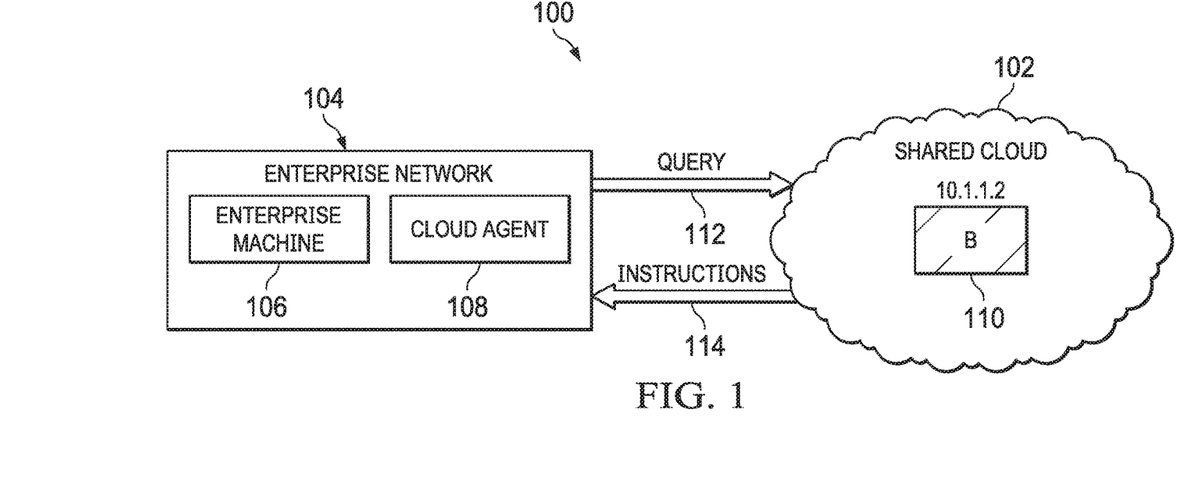
FIGS. 1 and 2 are block diagrams showing an example of a system for anonymizing user information in the cloud, according to some implementations of the present disclosure.
Figure 2:
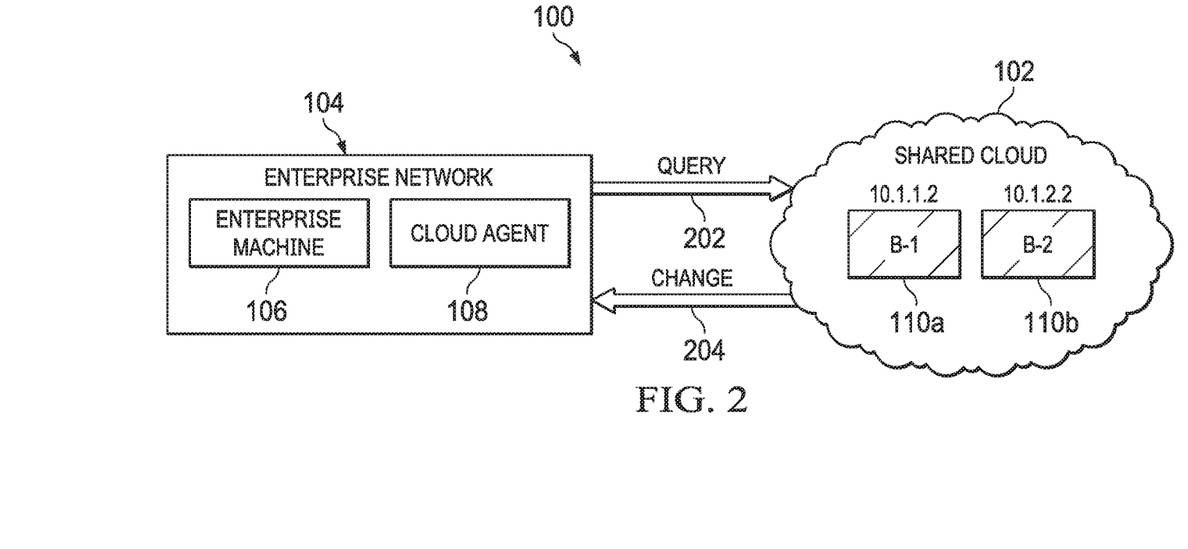

Upon this change, the cloud master would alter data allocation of Company B and pre-negotiated these changes through sending a notification to the cloud agent of Company B indicating this change, as depicted in FIGS. 1 and 2.

FIGS. 1 and 2 are block diagrams showing an example of a system 100 for anonymizing user information in the cloud, according to some implementations of the present disclosure. The system 100 includes a shared cloud 102 in which data for users is stored, including Company B data 110 (listed in Table 1 as occupying 800 GB). An enterprise network 104 can provide access to the shared cloud 102. The enterprise network 104 includes an enterprise machine 106 and a cloud agent 108. A query 112 sent by the enterprise network 104 to the shared cloud 102 can query the anonymity of a user, for example, Company B. The query 112 can be, for example, a query sent by the cloud agent of Company B to determine if normalization exists on Company B's anonymity. Instructions 114 can be returned, for example, to split the storage of Company B data 110 based on anonymity. The cloud agent 108 is the cloud agent for a single user. Multiple cloud agents 108 can exist, each corresponding to a single user, company, or other entity storing data in the cloud.

Referring to FIG. 2, a query 202 can be sent to the shared cloud 102 by cloud agent 108 for anonymity level check regarding data storage as an example, resulting in a change 204 being returned to the enterprise network 104. The change 204 can indicate, for example, that Company B's data is now stored as B-1 data 110a and B-2 data 110b. This allows an increase in the anonymity for Company B in the shared cloud.

An individual enterprise may be identified by knowing the number (or volume) of connections made with cloud providers. If a company has 1000 clients per day and it made 1000 data transmissions in total to the cloud, then it is possible to know the cloud service that is in use. By knowing public information such as the number of clients, an adversary performing a cyber-attack can recover the identity of the company and its cloud service provider.

The purpose of omitting or hiding this type of knowledge of the number of connections of a cloud user is to prevent relating publicly available information with a volume of connections. Making the identification process more complicated for a potential attacker can make it difficult for the attacker to learn the cloud service that is used and at which time.

A cloud agent can send a query to check if normalization exists, based on the number of connections. If not, the cloud master can instruct cloud agents with lowest connections ratio to issue some random traffic. In Table 1, initial ranges $R_3$ and $R_4$ for traffic are as follows.

$$20/hr \geq R_3 \geq 40/hr \quad (3)$$

$$0.1/hr \geq R_4 \geq 10/hr \quad (4)$$

Company C introduce lowest anonymity level; therefore, cloud master will request Company C's cloud agent to increase connections to 5 more per hour as it has the lowest ratio of connections. This additional traffic is dropped at cloud master once it has been received. First three companies fall within the same range $R_3$, so the anonymity level is updated as shown in table 2. $R_3$ and $R_4$ are just two example traffic ranges, and many more ranges can exist.

Access time is valuable information to an adversary. Access time will aid the attack to identify a company, and provide information on operations peak time which is the critical to companies since it falls within the business time. Beside cloud breach, companies could be affected with denial of service (DoS) attack by retrieving operation time by the attacker. As for cloud providers, the solution is forcing an access delay in which anonymity level is weak for a company. This solution is valid when there is no urgent request that is timely sensitive.

The cloud master finds a user with weak anonymity level, so it will send instructions to cloud agent to make some adjustment in requesting time. It would delay some traffic for some agents based on agents' feedback.

The disclosure of location data, such as a geographical location, can result in revealing a user's identity. An adversary can use location data to associate data with its owner. By intercepting traffic over a period of time, someone can use this location data or other data patterns to identify data owners. In communications between conventional cloud masters and agents, the source and destination are known, as traffic goes to and from public cloud providers which are susceptible to network sniffing and man-in-the-middle attack (MITM) attacks. Therefore, location data can be distinguishable among datasets and can result in recognizing and identifying cloud users. As a solution to prevent this problem, cloud agents can act as a proxy when receiving instructions from a cloud master regarding the anonymity level of location data.

Data type is another element that can serve as an identifier of users. For example the data type can be used to point to specific companies that are related to particular business activities and industries. Data types in the cloud should not be explicit. Therefore, some controls can be applied to prevent the leakage of such information. To increase the anonymity of this information, consider two the situations of the data: data at rest and data in transit. In the first case (data at rest), the use of data containers while applying concepts of the present disclosure can preserve a user's privacy. In the second case (data in transit), the cloud agent can send a query to the cloud master to provide information about the status of available data types. Upon the response from the master, cloud agent decides on normalizing traffic that is coming from local network Traffic will be dropped at cloud master as the purpose is to create confusion during transmission of data.

Figure 3:
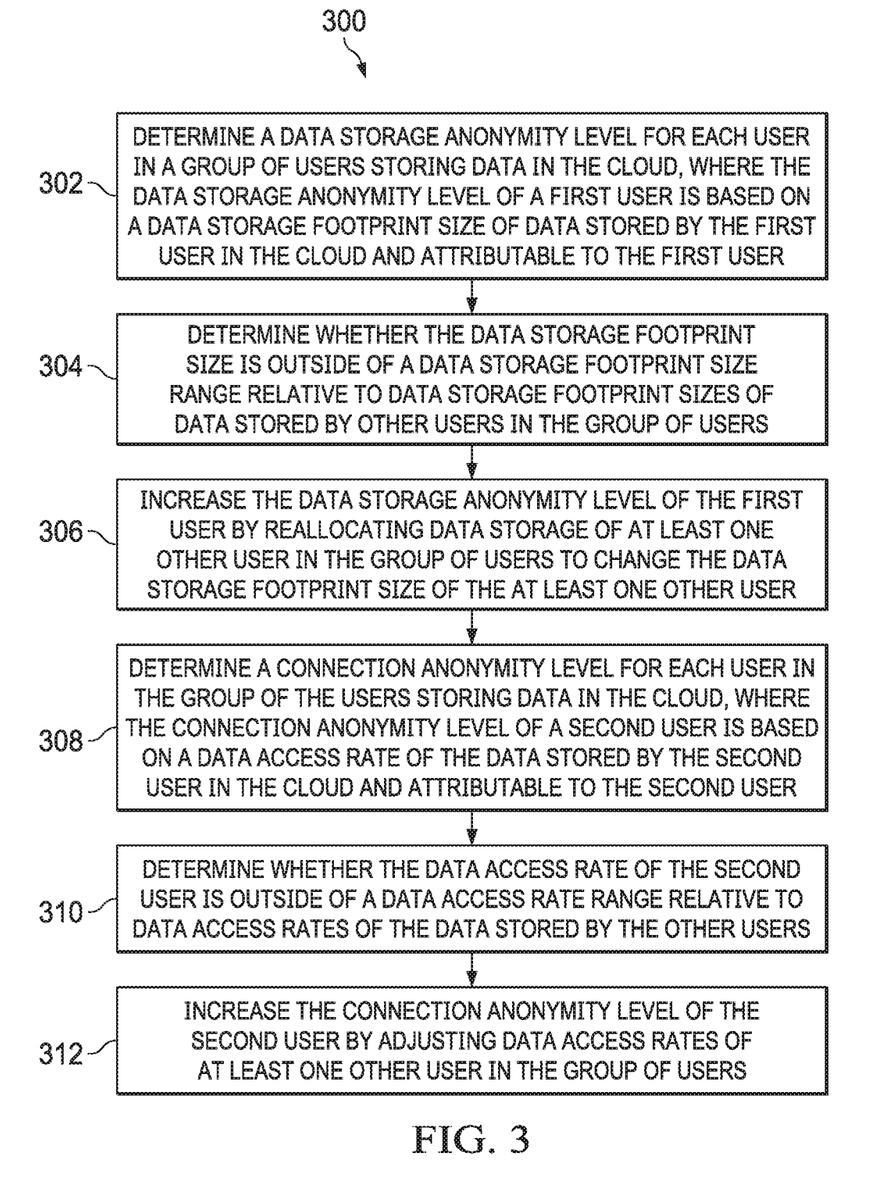
FIG. 3 is a flowchart of an example of a method for anonymizing users storing data in the cloud, according to some implementations of the present disclosure.

FIG. 3 is a flowchart of an example of a method 300 for anonymizing users storing data in the cloud, according to some implementations of the present disclosure. For clarity of presentation, the description that follows generally describes method 300 in the context of the other figures in this description. However, it will be understood that method 300 can be performed, for example, by any suitable system, environment, software, and hardware, or a combination of systems, environments, software, and hardware, as appropriate. In some implementations, various steps of method 300 can be run in parallel, in combination, in loops, or in any order.

At 302, a data storage anonymity level is determined for each user in a group of users storing data in the cloud. The data storage anonymity level of a first user (for example, Company E) is based on a data storage footprint size of data stored by the first user in the cloud and attributable to the first user. Continuing with the previous examples, Table 1 shows the anonymity levels for Company E and other companies. For example, Table 1 shows that anonymity of Company E is 0.2 and the anonymities of the other companies is 0.8. From 302, method 300 proceeds to 304.

At 304, a determination is made whether the data storage footprint size is outside of a data storage footprint size range relative to data storage footprint sizes of data stored by other users in the group of users. For example, Company E's data storage footprint size of 200 GB is outside of the range given by Equation (1). From 304, method 300 proceeds to 306.

At 306, the data storage anonymity level of the first user (for example, Company E) is increased by reallocating data storage of at least one other user (for example, Company B) in the group of users to change the data storage footprint size of the at least one other user. For example, reallocating the data storage of at least one other user in the group of users to change the data storage footprint size of the at least one other user can include dividing the data storage into two or more smaller data storage areas to produce smaller storage footprint sizes. As an example, Company B's data storage is split as shown in FIG. 2. The cloud master can send a change message to a cloud agent of the at least one other user (Company B), the change message indicating that the data storage has been reallocated. From 306, method 300 proceeds to 308.

At 308, a connection anonymity level is determined for each user in the group of the users storing data in the cloud, where the connection anonymity level of a second user (for example, Company C) is based on a data access rate of the data stored by the second user in the cloud and attributable to the second user. As an example, Table 1 traffic rates and corresponding anonymity levels can be determined for each of the companies. From 308, method 300 proceeds to 310.

At 310, a determination is made whether the data access rate of the second user is outside of a data access rate range relative to data access rates of the data stored by the other users. For example, Company C's traffic rate of 15/hour is determined to be outside of the range given by Equation (3). From 310, method 300 proceeds to 312.

At 312, the connection anonymity level of the second user is increased by adjusting data access rates of at least one other user in the group of users. As an example, increasing the connection anonymity level of the second user can include: sending, by the cloud master to the cloud agent of the second user, a request to provide random traffic of a pre-determined level (for example, an increase of 5 accesses per hour); receiving the random traffic at the cloud; and updating the connection anonymity level of the second user based on the random traffic. For example, Company C is asked to provide random traffic to make their footprint appear to be similar to other companies' footprints. The cloud master can establish identifiers to be used by the cloud agent to send the random traffic. The cloud master can dispose of the random traffic based on the identifiers. After 312, method 300 can stop.

In some implementations, method 300 further includes obfuscating a user's location data stored at the cloud to increase an anonymity level of location data for the user. For example, the cloud master can use one or more other alias geographical identifiers and maps to the real location information of the user.

Figure 4:
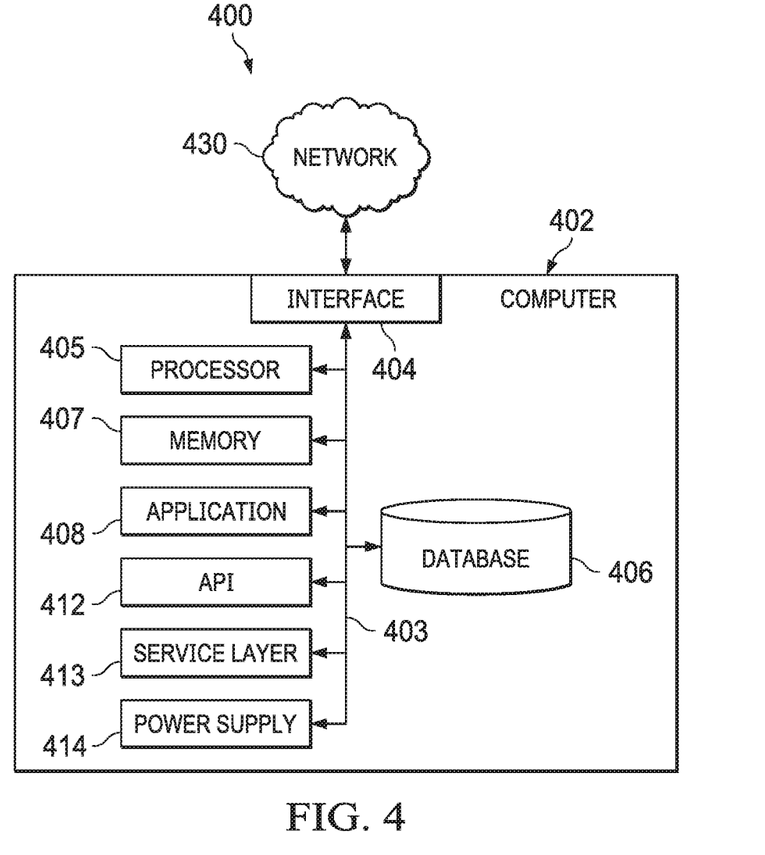
FIG. 4 is a block diagram illustrating an example computer system used to provide computational functionalities associated with described algorithms, methods, functions, processes, flows, and procedures as described in the present disclosure, according to some implementations of the present disclosure.

FIG. 4 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a top level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both) over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality.

While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Described implementations of the subject matter can include one or more features, alone or in combination.

For example, in a first implementation, a computer-implemented method includes the following. A data storage anonymity level is determined for each user in a group of users storing data in the cloud. The data storage anonymity level of a first user is based on a data storage footprint size of data stored by the first user in the cloud and attributable to the first user. A determination is made whether the data storage footprint size is outside of a data storage footprint size range relative to data storage footprint sizes of data stored by other users in the group of users. The data storage anonymity level of the first user is increased by reallocating data storage of at least one other user in the group of users to change the data storage footprint size of the at least one other user. A connection anonymity level is determined for each user in the group of the users storing data in the cloud, where the connection anonymity level of a second user is based on a data access rate of the data stored by the second user in the cloud and attributable to the second user. A determination is made whether the data access rate of the second user is outside of a data access rate range relative to data access rates of the data stored by the other users. The connection anonymity level of the second user increased by adjusting data access rates of at least one other user in the group of users.

The foregoing and other described implementations can each, optionally, include one or more of the following features:

A first feature, combinable with any of the following features, where reallocating the data storage of at least one other user in the group of users to change the data storage footprint size of the at least one other user includes dividing the data storage into two or more smaller data storage areas to produce smaller storage footprint sizes.

A second feature, combinable with any of the previous or following features, the method further including sending, by a cloud master, a change message to a cloud agent of the at least one other user (Company B), the change message indicating that the data storage has been reallocated.

A third feature, combinable with any of the previous or following features, where increasing the connection anonymity level of the second user includes: sending, by the cloud master to the cloud agent of the second user, a request to provide random traffic of a pre-determined level; receiving the random traffic at the cloud; and updating the connection anonymity level of the second user based on the random traffic.

A fourth feature, combinable with any of the previous or following features, the method further including establishing, by the cloud master, identifiers to be used by the cloud agent to send the random traffic.

A fifth feature, combinable with any of the previous or following features, the method further including disposing of the random traffic by the cloud master based on the identifiers.

A sixth feature, combinable with any of the previous or following features, the method further including obfuscating a user's location data stored at the cloud to increase an anonymity level of location data for the user.

In a second implementation, a non-transitory, computer-readable medium stores one or more instructions executable by a computer system to perform operations including the following. A data storage anonymity level is determined for each user in a group of users storing data in the cloud. The data storage anonymity level of a first user is based on a data storage footprint size of data stored by the first user in the cloud and attributable to the first user. A determination is made whether the data storage footprint size is outside of a data storage footprint size range relative to data storage footprint sizes of data stored by other users in the group of users. The data storage anonymity level of the first user is increased by reallocating data storage of at least one other user in the group of users to change the data storage footprint size of the at least one other user. A connection anonymity level is determined for each user in the group of the users storing data in the cloud, where the connection anonymity level of a second user is based on a data access rate of the data stored by the second user in the cloud and attributable to the second user. A determination is made whether the data access rate of the second user is outside of a data access rate range relative to data access rates of the data stored by the other users. The connection anonymity level of the second user increased by adjusting data access rates of at least one other user in the group of users.

The foregoing and other described implementations can each, optionally, include one or more of the following features:

A first feature, combinable with any of the following features, where reallocating the data storage of at least one other user in the group of users to change the data storage footprint size of the at least one other user includes dividing the data storage into two or more smaller data storage areas to produce smaller storage footprint sizes.

A second feature, combinable with any of the previous or following features, the operations further including sending, by a cloud master, a change message to a cloud agent of the at least one other user (Company B), the change message indicating that the data storage has been reallocated.

A third feature, combinable with any of the previous or following features, where increasing the connection anonymity level of the second user includes: sending, by the cloud master to the cloud agent of the second user, a request to provide random traffic of a pre-determined level; receiving the random traffic at the cloud; and updating the connection anonymity level of the second user based on the random traffic.

A fourth feature, combinable with any of the previous or following features, the operations further including establishing, by the cloud master, identifiers to be used by the cloud agent to send the random traffic.

A fifth feature, combinable with any of the previous or following features, the operations further including disposing of the random traffic by the cloud master based on the identifiers.

A sixth feature, combinable with any of the previous or following features, the operations further including obfuscating a user's location data stored at the cloud to increase an anonymity level of location data for the user.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A data storage anonymity level is determined for each user in a group of users storing data in the cloud. The data storage anonymity level of a first user is based on a data storage footprint size of data stored by the first user in the cloud and attributable to the first user. A determination is made whether the data storage footprint size is outside of a data storage footprint size range relative to data storage footprint sizes of data stored by other users in the group of users. The data storage anonymity level of the first user is increased by reallocating data storage of at least one other user in the group of users to change the data storage footprint size of the at least one other user. A connection anonymity level is determined for each user in the group of the users storing data in the cloud, where the connection anonymity level of a second user is based on a data access rate of the data stored by the second user in the cloud and attributable to the second user. A determination is made whether the data access rate of the second user is outside of a data access rate range relative to data access rates of the data stored by the other users. The connection anonymity level of the second user increased by adjusting data access rates of at least one other user in the group of users.

The foregoing and other described implementations can each, optionally, include one or more of the following features:

A first feature, combinable with any of the following features, where reallocating the data storage of at least one other user in the group of users to change the data storage footprint size of the at least one other user includes dividing the data storage into two or more smaller data storage areas to produce smaller storage footprint sizes.

A second feature, combinable with any of the previous or following features, the operations further including sending, by a cloud master, a change message to a cloud agent of the at least one other user (Company B), the change message indicating that the data storage has been reallocated.

A third feature, combinable with any of the previous or following features, where increasing the connection anonymity level of the second user includes: sending, by the cloud master to the cloud agent of the second user, a request to provide random traffic of a pre-determined level; receiving the random traffic at the cloud; and updating the connection anonymity level of the second user based on the random traffic.

A fourth feature, combinable with any of the previous or following features, the operations further including establishing, by the cloud master, identifiers to be used by the cloud agent to send the random traffic.

A fifth feature, combinable with any of the previous or following features, the operations further including disposing of the random traffic by the cloud master based on the identifiers.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks.

Computer-readable media can also include magneto-optical disks and optical memory devices and technologies including, for example, digital video disc (DVD), CD-ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    determining a data storage anonymity level for each user in a group of users storing data in the cloud, wherein the data storage anonymity level of a first user is based on a data storage footprint size of data stored by the first user in the cloud and attributable to the first user;
    determining whether the data storage footprint size is outside of a data storage footprint size range relative to data storage footprint sizes of data stored by other users in the group of users;
    increasing the data storage anonymity level of the first user by reallocating data storage of at least one other user in the group of users to change the data storage footprint size of the at least one other user;
    determining a connection anonymity level for each user in the group of the users storing data in the cloud, wherein the connection anonymity level of a second user is based on a data access rate of the data stored by the second user in the cloud and attributable to the second user;
    determining whether the data access rate of the second user is outside of a data access rate range relative to data access rates of the data stored by the other users; and
    increasing the connection anonymity level of the second user by adjusting data access rates of at least one other user in the group of users, wherein increasing the connection anonymity level of the second user includes:
        sending, by a cloud master to a cloud agent of the second user, a request to provide random traffic of a pre-determined level, wherein providing the random traffic of the pre-determined level increases a traffic footprint of the second user to match traffic footprints of other users having a connection anonymity level for data access rates of the data stored by the other users;
        receiving the random traffic at the cloud; and
        updating the connection anonymity level of the second user based on the random traffic.

2. The computer-implemented method of claim 1, wherein reallocating the data storage of at least one other user in the group of users to change the data storage footprint size of the at least one other user includes dividing the data storage into two or more smaller data storage areas to produce smaller storage footprint sizes.

3. The computer-implemented method of claim 2, further comprising sending, by the cloud master, a change message to the cloud agent of the at least one other user, the change message indicating that the data storage has been reallocated.

4. The computer-implemented method of claim 1, further comprising establishing, by the cloud master, identifiers to be used by the cloud agent to send the random traffic.

5. The computer-implemented method of claim 4, further comprising disposing of the random traffic by the cloud master based on the identifiers.

6. The computer-implemented method of claim 1, further comprising obfuscating a user's location data stored at the cloud to increase an anonymity level of location data for the user.

7. A computer-implemented system, comprising:
    a cloud master configured to maintain cloud storage of users' data in the cloud, the cloud master further configured to decrease the users' network footprints to avoid identification of the users based on patterns of data in the users' network footprints;
    cloud agents configured to communicate with the cloud master though queries generated by the cloud agents and responses generated by the cloud master, each one of the cloud agents serving a given one of the users;
    one or more processors; and
    a non-transitory computer-readable storage medium coupled to the one or more processors and storing programming instructions for execution by the one or more processors, the programming instructions instructing the one or more processors to perform operations comprising:
        determining a data storage anonymity level for each user in a group of users storing data in the cloud, wherein the data storage anonymity level of a first user is based on a data storage footprint size of data stored by the first user in the cloud and attributable to the first user;
        determining whether the data storage footprint size is outside of a data storage footprint size range relative to data storage footprint sizes of data stored by other users in the group of users;
        increasing the data storage anonymity level of the first user by reallocating data storage of at least one other user in the group of users to change the data storage footprint size of the at least one other user;
        determining a connection anonymity level for each user in the group of the users storing data in the cloud, wherein the connection anonymity level of a second user is based on a data access rate of the data stored by the second user in the cloud and attributable to the second user;
        determining whether the data access rate of the second user is outside of a data access rate range relative to data access rates of the data stored by the other users; and
        increasing the connection anonymity level of the second user by adjusting data access rates of at least one other user in the group of users, wherein increasing the connection anonymity level of the second user includes:
            sending, by a cloud master to a cloud agent of the second user, a request to provide random traffic of a pre-determined level, wherein providing the random traffic of the pre-determined level increases a traffic footprint of the second user to match traffic footprints of other users having a connection anonymity level for data access rates of the data stored by the other users;
            receiving the random traffic at the cloud; and
            updating the connection anonymity level of the second user based on the random traffic.

8. The computer-implemented system of claim 7, wherein reallocating the data storage of at least one other user in the group of users to change the data storage footprint size of the at least one other user includes dividing the data storage into two or more smaller data storage areas to produce smaller storage footprint sizes.

9. The computer-implemented system of claim 8, the operations further comprising sending, by the cloud master, a change message to the cloud agent of the at least one other user, the change message indicating that the data storage has been reallocated.

10. The computer-implemented system of claim 7, the operations further comprising establishing, by the cloud master, identifiers to be used by the cloud agent to send the random traffic.

11. The computer-implemented system of claim 10, the operations further comprising disposing of the random traffic by the cloud master based on the identifiers.

12. The computer-implemented system of claim 7, the operations further comprising obfuscating a user's location data stored at the cloud to increase an anonymity level of location data for the user.

13. A non-transitory, computer-readable medium storing one or more instructions executable by a computer system to perform operations comprising:
   determining a data storage anonymity level for each user in a group of users storing data in the cloud, wherein the data storage anonymity level of a first user is based on a data storage footprint size of data stored by the first user in the cloud and attributable to the first user;
   determining whether the data storage footprint size is outside of a data storage footprint size range relative to data storage footprint sizes of data stored by other users in the group of users;
   increasing the data storage anonymity level of the first user by reallocating data storage of at least one other user in the group of users to change the data storage footprint size of the at least one other user;
   determining a connection anonymity level for each user in the group of the users storing data in the cloud, wherein the connection anonymity level of a second user is based on a data access rate of the data stored by the second user in the cloud and attributable to the second user;
   determining whether the data access rate of the second user is outside of a data access rate range relative to data access rates of the data stored by the other users;
   and increasing the connection anonymity level of the second user by adjusting data access rates of at least one other user in the group of users, wherein increasing the connection anonymity level of the second user includes:
      sending, by a cloud master to a cloud agent of the second user, a request to provide random traffic of a pre-determined level, wherein providing the random traffic of the pre-determined level increases a traffic footprint of the second user to match traffic footprints of other users having a connection anonymity level for data access rates of the data stored by the other users;
      receiving the random traffic at the cloud; and
      updating the connection anonymity level of the second user based on the random traffic.

14. The non-transitory, computer-readable medium of claim 13, wherein reallocating the data storage of at least one other user in the group of users to change the data storage footprint size of the at least one other user includes dividing the data storage into two or more smaller data storage areas to produce smaller storage footprint sizes.

15. The non-transitory, computer-readable medium of claim 14, the operations further comprising sending, by the cloud master, a change message to the cloud agent of the at least one other user, the change message indicating that the data storage has been reallocated.

16. The non-transitory, computer-readable medium of claim 13, the operations further comprising establishing, by the cloud master, identifiers to be used by the cloud agent to send the random traffic.

17. The non-transitory, computer-readable medium of claim 16, the operations further comprising disposing of the random traffic by the cloud master based on the identifiers.

* * * * *